(12) United States Patent
Arendt et al.

(10) Patent No.: US 7,812,080 B2
(45) Date of Patent: *Oct. 12, 2010

(54) LOW-COLOR FOAM COMPOSITIONS

(75) Inventors: William D. Arendt, Libertyville, IL (US); Makarand V. Joshi, Grayslake, IL (US)

(73) Assignee: Genovique Specialties Holdings Corporation, Rosemont, IL (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/567,441

(22) Filed: Dec. 6, 2006

(65) Prior Publication Data

US 2008/0139680 A1      Jun. 12, 2008

(51) Int. Cl.
 *C08K 5/00*   (2006.01)
(52) U.S. Cl. ................. 524/292; 524/567; 524/568; 524/569; 521/73

(58) Field of Classification Search ............. 524/292, 524/567, 568, 569; 521/73
See application file for complete search history.

(56) References Cited

U.S. PATENT DOCUMENTS

| | | | | |
|---|---|---|---|---|
| 4,039,488 | A * | 8/1977 | VanderMark | 521/75 |
| 6,559,213 | B2 * | 5/2003 | Wesch | 524/318 |
| 6,583,207 | B2 * | 6/2003 | Stanhope et al. | 524/291 |
| 7,056,966 | B2 * | 6/2006 | Stanhope et al. | 524/290 |

\* cited by examiner

*Primary Examiner*—Peter D Mulcahy
(74) *Attorney, Agent, or Firm*—Brett L Nelson; Bernard J. Graves, Jr.

(57) ABSTRACT

Plastisols are provided which are effective for providing a foamed composition having an improved color. The plastisol includes a dispersed phase and a liquid phase. The dispersed phase includes an organic polymer and the liquid phase includes a plasticizer for said polymer. The plasticizer utilized has a hydroxyl number of about 30 or greater, and an acidity of not less than about 0.1% as benzoic acid.

4 Claims, No Drawings

LOW-COLOR FOAM COMPOSITIONS

This invention relates to plastisol compositions. More specifically, plastisol compositions are provided that include plasticizers having a hydroxyl number of about 30 or greater and an acid number of about 0.1% or less. Plastisols that include plasticizers having a hydroxyl number of about 30 or greater and an acid number of about 0.1% or less are effective for providing foam compositions with low color.

BACKGROUND

Plastisols comprise a dispersed phase that includes but is not limited to finely divided particles of a non-crosslinked thermoplastic organic polymer and a liquid phase comprising a plasticizer for the polymer. Plastisols may include any organic polymer as the dispersed phase and often include homo- and copolymers of vinyl chloride (PVC).

Major end use applications of plastisols are as films, coatings and molding materials. Films and coatings are prepared by applying the plastisol to a surface as a flowable liquid. The layer of plastisol is then heated to evaporate any volatile liquids and fuse the particles of polymer to form a solid layer.

PVC compounds are susceptible to discoloration absent proper stabilization. Also, while good stabilization features may be obtained by proper compounding, there still may be inherent deficiencies in the clarity, color and heat stability of the resin polymer which present limitations for commercial applications. Dispersion PVC is typically used in plastisol and organosol formulations, and there are limitations in inherent initial color after fusion, and color stability evidenced by premature yellowing of films either for unsupported films or film coatings on articles Studies with other dispersion resins of the current state of the art, as plastisol foam, still evidence some coloration limitations. It would be desirable therefore to improve the initial color.

SUMMARY

A plastisol is provided that includes a dispersed phase and a liquid phase. The dispersed phase includes an organic polymer and the liquid phase includes a plasticizer for said polymer. The plasticizer utilized has a hydroxyl number of about 30 or greater, and an acidity of not less than about 0.1% as benzoic acid. In an important aspect, the plasticizer has a hydroxyl number of about 30 to about 100 and Acidity of less than 0.1%. Plastisols that include plasticizers having the indicated combination of hydroxyl number and acid number are effective for providing a foamed composition having an improved color vs existing commercial Benzoate esters.

Polymers that may be utilized in the dispersed phase of the plastisol composition include homopolymers of vinyl chloride and copolymers of vinyl chloride with vinyl acetate, homopolymers and copolymers of ethylenically unsaturated acids and esters thereof. In an important aspect, the polymer includes homopolymers and copolymers of vinyl chloride.

Plasticizers that may be utilized in the liquid phase of the plastisol composition include diesters of benzoic acid and diethylene glycol, triethylene glycol, propylene glycol, dipropylene glycol, MP Diol, Neopentyl glycol and 1,3-butanediol and the combination thereof. In an important aspect, the plastisol composition is a blend of a dispersion grade and a blending grade of polyvinyl chloride and the plasticizer is a blend of the dibenzoates and monobenzoates of diethylene glycol and dipropylene glycol.

In another aspect, a foam is provided which is prepared from a plastisol. A process for preparing the foam includes forming a plastisol blowing agent precursor blend. The plastisol including a dispersed phase comprising particles of an organic polymer and a liquid phase comprising a plasticizer for said polymer. The plasticizer has a hydroxyl number of 30 or greater, and an acidity of not more than about 0.1% as benzoic acid. The plastisol blowing agent precursor blend is heated to a temperature effective for gelling the plastisol. The plastisol is then fused and blown to form the foam.

In another aspect, a method for preparing a plastisol is provided that includes blending a dispersed phase that includes particles of an organic polymer and a liquid phase that includes a plasticizer for said polymer. The plasticizer has a hydroxyl number of about 30 or greater, and an acidity of not more than about 0.1% as benzoic acid.

DETAILED DESCRIPTION

Definitions

The term "hydroxyl number" or "hydroxyl value" which is also called "acetyl value" is a number which indicates the extent to which a substance may be acetylated; it is the number of milligrams of potassium hydroxide required for neutralization of the acetic acid liberated on saponifying 1 g of acetylated sample. The hydroxyl number units are mg KOH/ gram of plasticizer. Procedures for determining the hydroxyl number of chemical compositions are known. One procedure is described in ASTM Test Method E 222-00. Essentially all the contribution to hydroxyl number comes from monoesters of diols.

As used herein, the term "plastisol" refers to liquid polymer compositions comprising a particulate form of at least one organic polymer suspended in a liquid medium that includes at least one plasticizer for the polymer and at least one liquid organic compound that functions as a diluent. Plastisols containing a total of more than about five weight percent of one or more of these liquid diluents in addition to the required plasticizers are also referred to as "organosols".

As used herein, the term "miscible" means a liquid which is dissolved or is soluble in a liquid. "Dissolved" means that the material which is dissolved does not exist in a liquid in particulate form having at least about 5 weight percent particles having diameters greater than about 30 nM which are as measured by dynamic light scattering. "Soluble" means a liquid dissolved in a liquid or a solid dissolved in a liquid.

Polymers

Any of the known polymers that can be formulated into a plastisol can be used to prepare plastisols in accordance with the present invention. The polymers constituting the dispersed phase of the present plastisols include polymers of ethylenically unsaturated organic monomers and mixtures of these monomers that can be prepared by a free radical-initiated emulsion polymerization. Suitable monomers include but are not limited to 1) ethylenically unsaturated halocarbons such as vinyl chloride, 2) ethylenically unsaturated acids such as acrylic and methacrylic acids and esters thereof with alcohols containing up to eight or more carbon atoms.

Homopolymers and copolymers of vinyl chloride and the homo- and copolymers of esters of acrylic and methacrylic acid are preferred based on their wide range of commercial applicability in plastisols containing esters of benzoic acid as the plasticizer. Vinyl chloride polymers means vinyl chloride homo- and copolymers, the latter containing at least 50% by weight of vinyl chloride and at least one monomer which is copolymerizable with vinyl chloride. The copolymerizable monomers are those generally employed in the traditional methods of copolymerization of vinyl chloride. By way of examples there may be mentioned the vinyl esters of mono- and polycarboxylic acids, such as vinyl acetate, propionate and benzoate, unsaturated mono- and polycarboxylic acids such as acrylic, methacrylic, maleic, fumaric and itaconic acids, and their aliphatic, cycloaliphatic and aromatic esters, their amides, and their nitriles, alkyl, vinyl and vinylidene halides, and alkyl vinyl ethers. The vinyl chloride polymers employed within the scope of the present invention are preferably vinyl chloride homopolymers, copolymers of vinyl chloride and vinyl acetate and mixtures of these copolymers with each other or with a vinyl chloride homopolymer. Vinyl chloride polymers suitable for preparing the present plastisols are classified according to particle size. Dispersion grade resins typically exhibit particle sizes of from 0.5 to about 5 microns, and blending grade resins from about 10 to about 55 microns Plasticizers Many of these plasticizers are esters of mono- and dicarboxylic acids. A detailed discussion of suitable plasticizers can be found in The Technology of Plasticizers, Edited by J. Kern Sears and Joseph R. Darby, published by John Wiley and Sons (1982), which is incorporated herein by reference.

Plasticizers preferred for use in preparing the plastisols of the present invention include but are not limited to: diesters and monoesters of benzoic acid with dihydric alcohols, glycols and ethers of glycols, and diesters of phthalic acid and monohydric alcohols.

Monohydric alcohols suitable for preparing esters of phthalic acid contain from 1 to 8 or more carbon atoms in a linear or branched configuration and include but are not limited to methyl, ethyl, propyl, isopropyl, 2-ethylhexyl, and isononyl alcohols. Dihydric alcohols suitable for preparing esters of benzoic acid include but are not limited to propylene glycol and oligomeric ether glycols such as diethylene glycol, triethylene glycol, dipropylene glycol and 1,3-butanediol and combination thereof.

The benzoate and phthalate plasticizers can be used individually or in mixtures. Mixtures of benzoic acid esters derived from the dimeric and/or trimeric glycol ethers of ethylene and propylene glycols are particularly preferred plasticizers for the present plastisol compositions.

Auxiliary Plasticizers

In addition to the plasticizers listed in the preceding section, which can also be referred to as primary plasticizers, the present plastisols can optionally include one or more auxiliary plasticizers which, while not effective plasticizers when used alone, act in combination with primary plasticizers to adjust the viscosity of the plastisol to the desired level. Preferred secondary plasticizers are 1) liquid monobenzoates derived from benzoic acid and a monohydric alcohol such as 2-ethylhexanol, isooctanol or isononanol and 2) liquid monobenzoates of diols, glycols and ethers of glycols containing from 2 to 8 or more carbon atoms, and 3) commercially available esters of diols, such as the mono- and diisobutyrates of 2,2,4-trimethyl-1,3-pentanediol.

Organic Diluent

The third component of the present plastisols is at least one organic diluent that is not a solvent for the polymer at the required concentration level. Preferred diluents include hydrocarbons and ketones that are liquids at 25° C. Liquid hydrocarbons are typically supplied as mixtures of aromatic and/or aliphatic hydrocarbons boiling within a specified temperature range.

Mixtures of cycloaliphatic hydrocarbons alone or in combination with linear and branched aliphatic hydrocarbons are suitable diluents for plastisols containing vinyl chloride and at least one glycol ester of benzoic acid as the primary plasticizer.

The total concentration of all diluents is typically from about 2 to about 55 percent, preferably from about 10 to 50 percent, based on the total weight of the plasticizer and any other liquid ingredients present in the plastisol.

Additional Ingredients

In addition to the polymer, plasticizer and liquid diluent(s) plastisols may contain additional solid and/or liquid ingredients including but not limited to Fillers such as calcium carbonate;

Heat stabilizers such as the calcium and barium salts of fatty acids;

Esters of phosphoric acid;

Foaming agents such as azodicarbonamides;

Foaming catalysts such as zinc oxide;

Flame retarding agents;

Surfactants;

UV absorbers; and

Pigments such as titanium dioxide.

The plastisols of the present invention are useful in end-use applications requiring rapid application of a plastisol. These applications include but are not limited to 1) coatings that are applied onto metallic or non-metallic surfaces by dipping, spraying or the use of coating rollers and 2) as molding materials. The plastisols are particularly useful for coating on to layers of fabric, particularly those used in the construction of resilient floor coverings and wall coverings, and as spray coatings for metal surfaces. Molding applications include but are not limited to fabrication of shaped articles by techniques referred to as "slush molding", rotation molding and the use of both closed and open molds.

The following examples are intended to illustrate the invention and not to limit it. All references cited in the present specification are hereby incorporated by reference.

EXAMPLE 1

The plastisol formulas (Formulations 1-4) were prepared in a high shear mixer at 1250 RPM for ten minutes and degassed for 30 minutes while stirring at 200 rpm with vacuum maintained at less than 1 Torr.

| | phr (Part per Hundred Resin) Formulation 1 | Formulation 2 | Formulation 3 | Formulation 4 |
|---|---|---|---|---|
| Raw Materials | | | | |
| Dispersion Resin | 60 | 60 | 60 | 60 |
| Blending Resin | 40 | 40 | 40 | 40 |
| Calcium Carbonate | 15 | 15 | 15 | 15 |
| Butyl Benzyl Phthalate | 35 | | | |
| Diethylene and Dipropylene Glycol Dibenzoate blend - Low Hydroxyl, Low Acid | | 35 | | |
| Diethylene and Dipropylene Glycol Dibenzoate blend - High Hydroxyl, Low Acid | | | 35 | |
| Diethylene and Dipropylene Glycol Dibenzoate blend - High Hydroxyl, High Acid | | | | 35 |
| 2,2,4-trimethyl-1,3-pentanediol diisobutyrate | 10 | 10 | 10 | 10 |
| Carboxylic Acid Derivative | 8 | 8 | 8 | 8 |
| Blow-mix | | | | |
| Butyl Benzyl Phthalate | 4.7 | | | |
| Diethylene and Dipropylene Glycol Dibenzoate blend - Low Hydroxyl, Low Acid | | 4.7 | | |
| Diethylene and Dipropylene Glycol Dibenzoate blend - High Hydroxyl, Low Acid | | | 4.7 | |
| Diethylene and Dipropylene Glycol Dibenzoate blend - High Hydroxyl, High Acid | | | | 4.7 |
| Dispersant | 0.1 | 0.1 | 0.1 | 0.1 |
| Zinc Oxide | 0.6 | 0.6 | 0.6 | 0.6 |
| Azodicarbidimide | 1.2 | 1.2 | 1.2 | 1.2 |
| Titanium Dioxide | 0.6 | 0.6 | 0.6 | 0.6 |
| Calcium Carbonate | 2.9 | 2.9 | 2.9 | 2.9 |

Physical properties of the formulation were as follows.

| | Physical Properties Formulation 1 | Formulation 2 | Formulation 3 | Formulation 4 |
|---|---|---|---|---|
| Torque Rheometer Viscosity (mPa s) | | | | |
| 200 $sec_{-1}$ | 3160 | 3590 | 3760 | 3830 |
| 800 $sec_{-1}$ | 2730 | 3240 | 3200 | 3280 |
| Blow-Ratio | 2.49 | 2.52 | 2.58 | 2.76 |
| Gel Color - YI-1925 | 19.86 | 19.97 | 19.98 | 20.00 |
| Blown Color - YI-1925 | 28.41 | 28.54 | 23.27 | 24.16 |
| High Heat Stability (180° C., 1900 RPM) | | | | |
| First start to see color (min.) | 2 | 2 | 3 | 2 |
| Completely black (min.) | 7 | 7 | 8 | 6 |
| Low Heat Stability - 150° F. (66° C.) YI 1925 | | | | |
| 0 week | 27.69 | 29.61 | 25.17 | 26.54 |
| 1 week | 25.78 | 27.26 | 24.49 | 28.26 |
| 2 weeks | 25.99 | 26.97 | 24.84 | 27.8 |
| 3 weeks | 26.06 | 27.55 | 25.33 | 29.23 |

| | Physical Properties Formulation 1 | Formulation 2 | Formulation 3 | Formulation 4 |
|---|---|---|---|---|
| % Change after 1 week | 6.90 | 7.94 | 2.70 | −6.48 |
| % Change after 2 week | 6.14 | 8.92 | 1.31 | −4.75 |
| % Change after 3 week | 5.89 | 6.96 | −0.64 | −10.14 |
| Hydroxyl Number | | 15 | 30 | 30 |
| % Acidity | 0.1% PA | 0.1% BA | 0.1% BA | 1% BA |

PA is phthalic acid BA is benzoic acid

Yellowness index as measured by ASTM D-1925.

That which is claimed is:

1. A foam prepared from a plastisol by a process comprising:

forming a plastisol blowing agent precursor blend, the plastisol including a dispersed phase comprising particles of an organic polymer, wherein the organic polymer is selected from the group consisting of homopolymers and copolymers of vinyl chloride, and a liquid phase comprising a plasticizer for said polymer, the plasticizer having a hydroxyl number of 30 or greater, and an acidity of not more than about 0.1% as benzoic acid; and heating the plastisol blowing agent precursor blend to a temperature effective for gelling the plastisol and fusing and blowing the plastisol to form the foam;

wherein the plasticizer is at least one member selected from the group consisting of diesters and monoesters of benzoic acid and diethylene glycol, triethylene glycol, propylene glycol, dipropylene glycol, M P Diol, neopentyl glycol and 1,3-butanediol and the combination thereof, and wherein the plasticizer is effective for providing the foam with a color of less than 28YI.

2. The foam of claim 1 wherein the plasticizer has a hydroxyl number of about 30 to about 100.

3. The foam of claim 1 wherein the plastisol further comprises at least one ingredient selected from the group consisting of fillers, pigments, heat stabilizers, lubricants, flame retardants, esters of phosphoric acid, foaming agents, foaming catalysts, surfactants and UV absorbers.

4. The foam of claim 1 wherein the fusible organic polymer is a blend of a dispersion grade and a blending grade of polyvinyl chloride and the plasticizer is a blend of the mono- and dibenzoates of diethylene glycol and dipropylene glycol.

* * * * *